United States Patent
Gandhi et al.

(10) Patent No.: US 9,830,677 B2
(45) Date of Patent: *Nov. 28, 2017

(54) GRAPHICS PROCESSING UNIT RESOURCE SHARING

(71) Applicant: International Business Machines Corporation, Armonk, NY (US)

(72) Inventors: Anshul Gandhi, White Plains, NY (US); Hui Lei, Scarsdale, NY (US); Jayaram Kallapalayam Radhakrishnan, Mount Kisco, NY (US); Charles O. Schulz, Ridgefield, CT (US); Shu Tao, Irvington, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/059,580

(22) Filed: Mar. 3, 2016

(65) Prior Publication Data

US 2017/0256017 A1     Sep. 7, 2017

(51) Int. Cl.
*G06T 1/20* (2006.01)
*G06T 1/60* (2006.01)

(52) U.S. Cl.
CPC . *G06T 1/20* (2013.01); *G06T 1/60* (2013.01)

(58) Field of Classification Search
None
See application file for complete search history.

(56) References Cited

U.S. PATENT DOCUMENTS

| | | | |
|---|---|---|---|
| 2011/0115802 A1* | 5/2011 | Mantor | G06F 9/5027 345/520 |
| 2015/0128136 A1* | 5/2015 | Rafique | G06F 9/5077 718/1 |
| 2015/0212859 A1* | 7/2015 | Rafique | G06F 9/45533 345/503 |

OTHER PUBLICATIONS

Adriaens, Jacob T., et al. "The case for GPGPU spatial multitasking." High Performance Computer Architecture (HPCA), 2012 IEEE 18th International Symposium on. IEEE, 2012.*

(Continued)

*Primary Examiner* — Ryan D McCulley
(74) *Attorney, Agent, or Firm* — Cantor Colburn LLP; David Quinn

(57) ABSTRACT

Examples of GPU resource sharing among applications are disclosed. In one example, a method includes receiving a first request from a first application of the plurality of applications for first requested GPU resources, and receiving a second request from a second application of the plurality of applications for second GPU resources. The method also includes, responsive to determining that the first requested GPU resources are available, allocating a first slice of the GPU resources with a first requested amount of resources to the first application and, responsive to determining that the second requested GPU resources are available, allocating a second slice of the GPU resources with a second requested amount of resources to the second application. Further, the method includes enabling the first application and the second application to execute concurrently within the first slice of the GPU and the second slice of the GPU respectively.

17 Claims, 7 Drawing Sheets

(56) References Cited

OTHER PUBLICATIONS

Aguilera, Paula, et al. "Process variation-aware workload partitioning algorithms for GPUs supporting spatial-multitasking." Proceedings of the conference on Design, Automation & Test in Europe. European Design and Automation Association, 2014.*
Jog, Adwait, et al. "Anatomy of gpu memory system for multi-application execution." Proceedings of the 2015 International Symposium on Memory Systems. ACM, 2015.*
Liang, Yun, et al. "Efficient gpu spatial-temporal multitasking." IEEE Transactions on Parallel and Distributed Systems 26.3 (2015): 748-760.*
Ravi, Vignesh T., et al. "Supporting GPU sharing in cloud environments with a transparent runtime consolidation framework." Proceedings of the 20th international symposium on High performance distributed computing. ACM, 2011.*
Ukidave, Yash. Architectural and Runtime Enhancements for Dynamically Controlled Multi-Level Concurrency on GPUs. Diss. Northeastern University Boston, 2015.*
Wang, Zhenning, et al. "Simultaneous Multikernel: Fine-Grained Sharing of GPUs." IEEE Computer Architecture Letters 15.2 (2016): 113-116.*
Zhong, Jianlong, and Bingsheng He. "Kernelet: High-throughput GPU kernel executions with dynamic slicing and scheduling." IEEE Transactions on Parallel and Distributed Systems 25.6 (2014): 1522-1532.*
Article, "True Virtual Acceleration With GPUs" Nvidia, Grid-Technology, Apr. 1993, p. 1-5.
B. Hindman, et al.,"Mesos: A Platform for Fine-Grained Resource Sharing in the Data Center", ACM Science, Berkeley, Sep. 30, 2010, p. 1-14.
Hadoop, "YARN", The Apache Software Foundation, Jan. 16, Ver.2.72, 2016, p. 1-2.
K. Menychtas, et al.,"Disengaged Scheduling for Fair, Protected Access to Fast Computational Accelerators" ASPLOS, ACM, Mar. 1-5, 2014, p. 1-15.
K. Tian, et al.,"A Full GPU Virtualization Solution with Mediated Pass-Through"Usenix Advanced Computing System Association, Jun. 19-20, 2014, p. 1-13.
M. Dowty, et al.,"GPU Virtualization on VMware's Hosted I/O Architecture", USENIX Workhop on I/O Virtualization, 2008, p. 1-8.
V. Gupta, et al., "Pegasus: Coordinated Scheduling for Virtualized Accelerator-based Systems", Usenix, Jun. 25, 2011, p. 1-14.
Anshul Gandhi, et al. "Graphics Processing Unit Resource Sharing," U.S. Appl. No. 15/059,822, filed Mar. 3, 2016.
List of IBM Patents or Patent Applications Treated as Related, (Appendix P), filed Mar. 29, 2016, 2 pages.

* cited by examiner

GRAPHICS PROCESSING UNIT RESOURCE SHARING

BACKGROUND

The present disclosure relates to sharing computing resources and, more particularly, to graphic processing unit (GPU) and general purpose graphics processing unit (GPGPU) resource sharing.

A parallel compute-intensive application may leverage GPUs to perform computational aspects of the application. GPUs perform these aspects more quickly and efficiently than a traditional central processing unit (CPU) due to the parallel architecture of GPUs. Existing large-scale compute infrastructures, such as servers, private data centers, and Infrastructure as a Service (IaaS) clouds offer whole GPU, but they do not presently enable applications running on the same server or cluster to share GPUs. This is because there is no software mechanism, even at the level of a single computer, to share a GPU concurrently between two applications. Lack of such a solution leads to decreased utilization, increased costs, and energy wastage, both at the granularity of a single computer as well as a cluster of computers (e.g., in a data center).

In some situations, existing GPUs on a server can only be shared among threads of a single process. GPUs have massive computing resources: for example, some GPUs have upwards of 4,000 processing cores. It is difficult for software developers to write programs that completely utilize the GPU because of the single instruction, multiple data (SIMD) nature of GPUs. Best-effort greedy allocation of resources may lead to resource hogging (e.g., a program (often called a "kernel") which utilizes 40% of the GPU processing cores but hogs 90% of the GPU memory, a program that uses only 40% of both GPU processing cores and memory but prevents other programs from using the remaining 60% capacity of the resources which remain available, etc.). Moreover, no security or non-interference guarantees are provided between different concurrent or non-concurrent programs when they use the GPU (e.g., subsequent to each other).

SUMMARY

According to examples of the present disclose, techniques including methods, systems, and/or computer program products for sharing resources of a graphics processing unit (GPU) among a plurality of applications are provided. An example method may include receiving a first request from a first application of the plurality of applications for first requested GPU resources, the GPU resources comprising a processor and a memory. The method may further include receiving a second request from a second application of the plurality of applications for second GPU resources. The method may also include, responsive to determining that the first requested GPU resources are available, allocating a first slice of the GPU resources with a first requested amount of resources to the first application. Additionally, the method may include, responsive to determining that the second requested GPU resources are available, allocating a second slice of the GPU resources with a second requested amount of resources to the second application. Further, the method may include enabling the first application and the second application to execute concurrently within the first slice of the GPU and the second slice of the GPU respectively.

Additional features and advantages are realized through the techniques of the present disclosure. Other aspects are described in detail herein and are considered a part of the disclosure. For a better understanding of the present disclosure with the advantages and the features, refer to the following description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages thereof, are apparent from the following detailed description taken in conjunction with the accompanying drawings in which:

DETAILED DESCRIPTION

Various implementations are described below by referring to several examples of GPU resource sharing. In particular, the present techniques enable the resources (e.g., processing cores and memory) to be partitioned or "sliced" into containers to execute multiple applications concurrently. The present techniques enable multiple applications to share the resources of a single GPU in a space-based or hybrid space and time-based partitioning manner. Moreover, the present techniques enable an application to use multiple GPUs, or parts thereof, in a distributed environment.

The present techniques enable increased utilization due to sharing of GPUs, thereby reducing costs and energy consumption. Additionally, the present techniques enable applications to leverage portions of multiple, distributed GPUs. Moreover, the present techniques enable distributed applications that require more than one GPU. The present techniques also minimize the effort needed to modify applications to share GPU resources. These and other advantages will be apparent from the description that follows.

Figure 1:
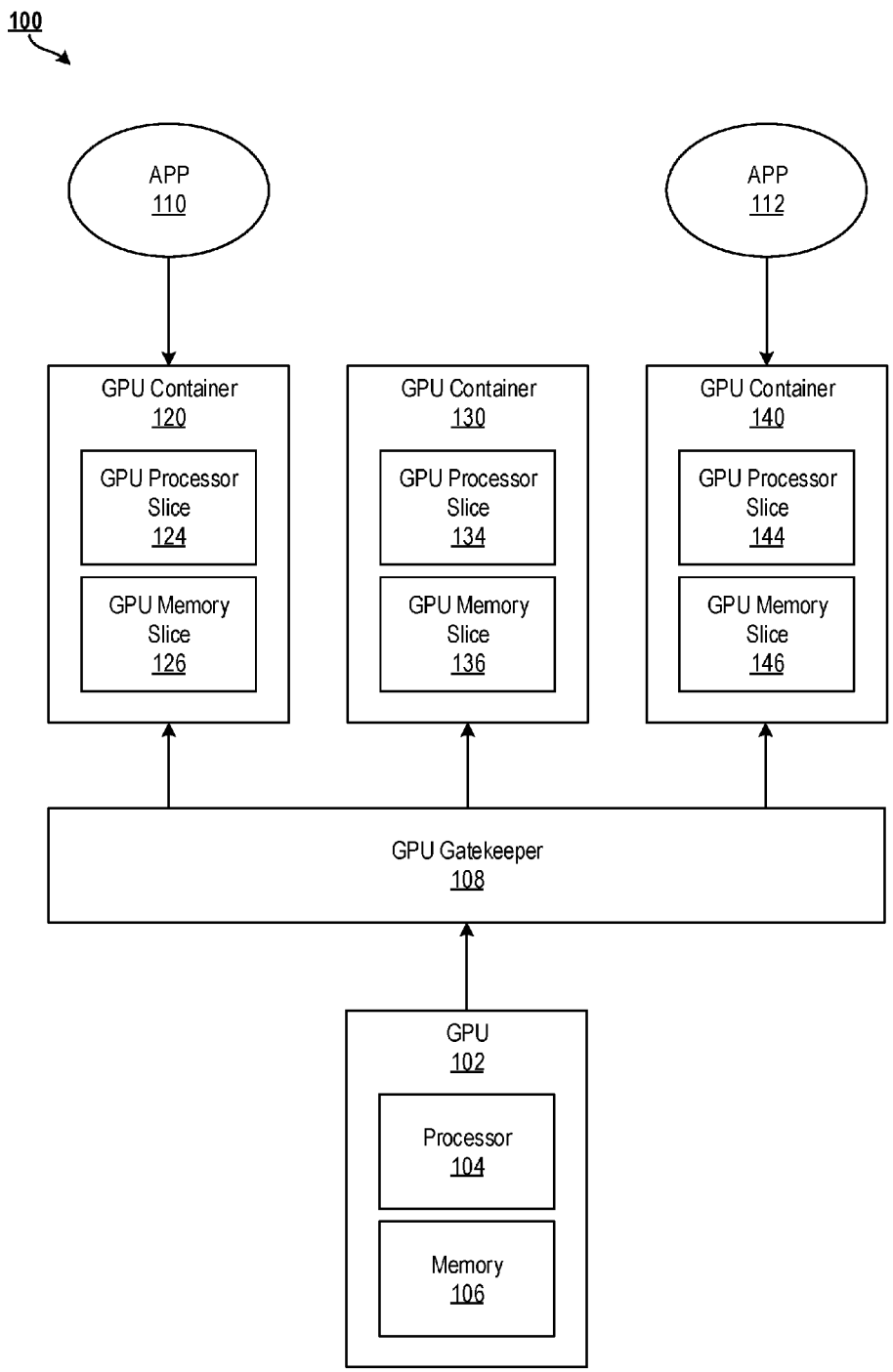
FIG. 1 illustrates a block diagram of a processing system for GPU resource sharing according to examples of the present disclosure.

FIG. 1 illustrates a block diagram of a processing system 100 for GPU resource sharing according to examples of the present disclosure. In particular, processing system 100 may include a GPU 102 comprising a processor 104 and a memory 106. Processor 104 may be a multi-core processor (e.g., processor 104 may be a 4,000 core processor, an 8,000 core processor, etc.). Memory 106 may be a random access memory, for example, that stores instructions that are executable by processor 104. It should be appreciated that, in other examples, additional GPUs may be utilized. Also, a single processing system 100 may have more than one GPU.

Processing system 100 includes a GPU gatekeeper 108, which may be a software module sitting on top of a driver (not shown) of the GPU 102. For example, GPU gatekeeper 108 may be implemented as a Linux loadable kernel module to extend the driver of GPU 102. In other examples, GPU gatekeeper 108 is built as part of the driver of GPU 102. GPU gatekeeper 108 mediates access to GPU 102 on processing system 100 to ensure that applications (APP) 110, 112 can share the resources of GPU 102 (including processor 104 and memory 106) in a fair and secure/protected manner. GPU gatekeeper 108 also enables sharing of GPU 102 (or multiple GPUs) along both space and time dimensions. That is, GPU gatekeeper 108 partitions (i.e., slices) GPU 102 and its resources (i.e., processor 104 and memory 106) by amount of processing power (i.e., number of cores) and amount of memory (i.e., size in bytes). A slice is a specific portion of a hardware unit (e.g., 1 core of a processor or 1 byte of memory) of a GPU (e.g., GPU 102). Slice size may be specified by a fairness policy as discussed below.

In the example of FIG. 1, processor 104 and memory 106 of GPU 102 are sliced into GPU processor slices 124, 134, 144 and GPU memory slices 126, 136, 146, respectively. In examples, the slices are contained within containers (i.e., GPU containers that act similarly to Linux Groups). That is, GPU gatekeeper 108 exposes slices as Linux containers (e.g., using Linux Groups) containing a specific number of GPU cores and a specific amount of GPU memory. Applications, such as applications 110, 112 execute inside the containers (e.g., containers 120, 130, 140). In the example of FIG. 1, GPU processor slice 124 and GPU memory slice 126 are contained within GPU container 120; GPU processor slice 134 and GPU memory slice 136 are contained within GPU container 130, and GPU processor slice 144 and GPU memory slice 146 are contained within GPU container 140. GPU processor slices 124, 134, 144 represent allocated portions of processor 104 of GPU 102. Likewise, GPU memory slices 126, 136, 146 represent allocated portions of memory 106 of GPU 102. Each container 120, 130, 140 can be time-shared among multiple applications (e.g., applications 110, 112), thereby enabling time-based and space-based sharing of GPU 102.

The resources of GPU 102 may be sliced into containers in using a dedicated mode or a multiplexed mode. In the dedicated mode, the total amount of allocated resources between the containers should be less than or equal to the total amount of available resources of the GPU. For example, if GPU 102 has a 4,000 core processor 104 and a 4 GB memory 106, it can be divided into 4 containers of slices with 1,000 cores with 1 GB of memory each. In this way, the total amount of allocated resources between the containers does not exceed the total amount of available resources.

In the multiplexed mode, the total amount of allocated resources may be greater than the total amount of available resources of the GPU. For example, if GPU 102 has a 4,000 core processor 104 and a 4 GB memory 106, it can be divided into 16 containers with slices of 1,000 cores with 1 GB of memory each. In this way, GPU 102 is overcommitted. However, time-based multiplexing can be applied to limit the amount of time each container can execute. In this example, each of the 16 containers may be limited to executing for 25% of total runtime. That is each container may be able to execute 25% of the time. If a time slice of 10 seconds is considered, for example, each container may utilize 1,000 cores of processor 104 and 1 GB of memory 106 for 2.5 seconds. In other examples, the overcommitting may be addressed based on priority-based multiplexing with lower priority containers having to wait for higher priority containers.

GPU gatekeeper 108 may slice processor 104 and memory 106 according to a fairness policy to provide for fairness between the sharing of the resources of GPU 102. In examples, the fairness policy may be configurable, such as by a system administrator. Fairness may be implemented with respect to time division multiplexing, space, etc. In examples, the fairness policy may impose proportional sharing of memory with respect to processing cores. The fairness policy may be between users to prevent a user from dominating resources. This may be configurable by a system admin.

In an example, the fairness policy may indicate that a user cannot consume more than 10% of GPU 102 (i.e., 10% of processor 104 and 10% of memory 106). In another example, the fairness policy may indicate that each container 120, 130, 140 cannot have a memory slice that is not proportional to the processor slice. For instance, if processor 104 is a 4,000 core processor and memory 106 is an 8 GB memory, a processor slice that utilizes 1,000 cores of the 4,000 cores of processor 104 may only use the same or lower amount of memory (i.e., 2 GB of the 8 GB memory 106). As another example, a fairness policy may establish that a percent of memory should be less than or equal to the percent of processor. For example, if 20% of the processor is used, no more than 20% of the memory may also be used.

GPU gatekeeper 108 also provides security by preventing one application (i.e., APP 110) from viewing the data and execution context of another application (i.e., APP 112) that shares GPU 102 and its resources.

Figure 2:
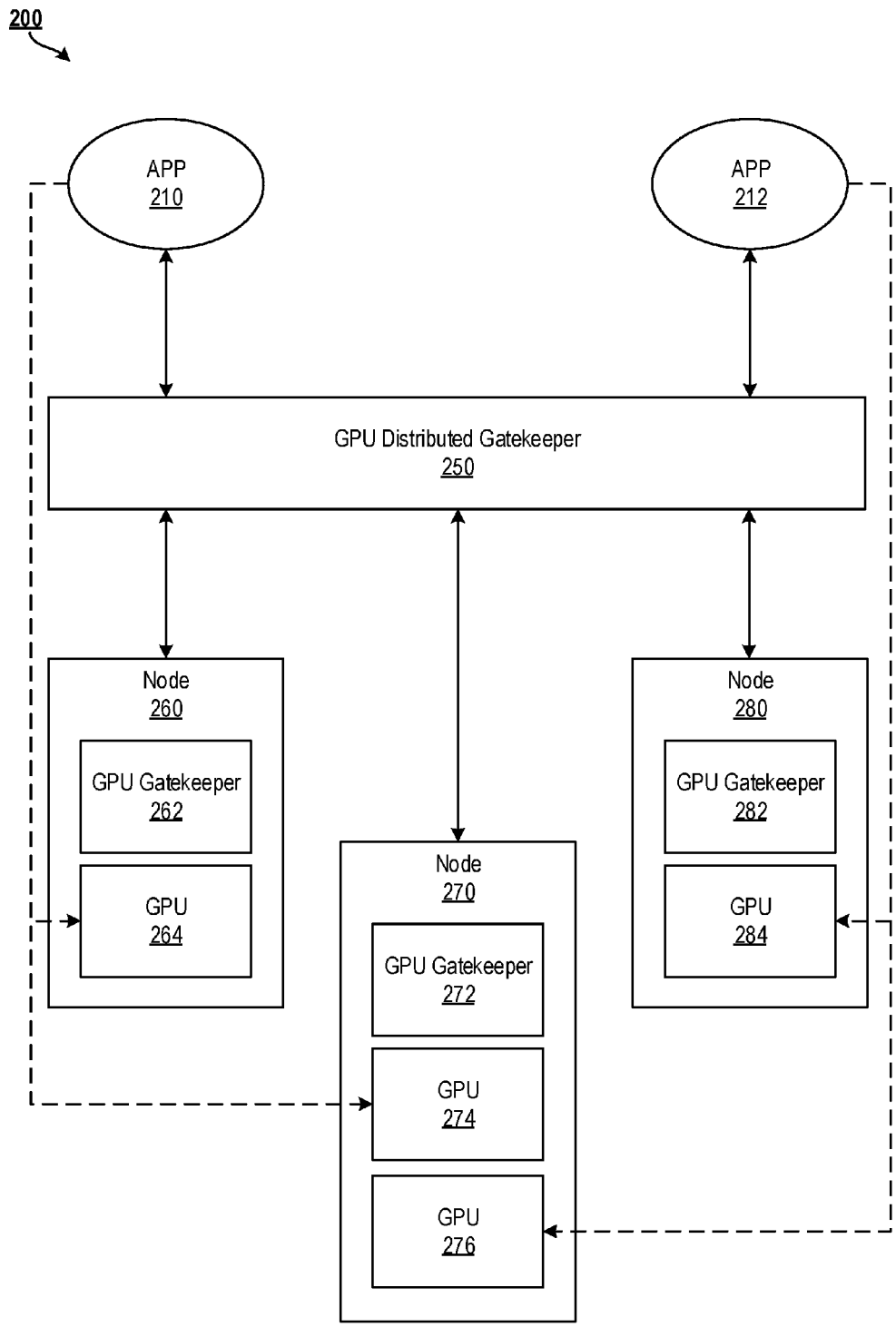
FIG. 2 illustrates a block diagram of a processing system for GPU resource sharing in a distributed environment according to examples of the present disclosure.

FIG. 2 illustrates a block diagram of a processing system 200 for GPU resource sharing in a distributed environment according to examples of the present disclosure. In particular, FIG. 2 utilizes a GPU distributed gatekeeper 250 to enable applications 210, 212 to leverage multiple GPUs 264, 274, 276, 284. GPU distributed gatekeeper 250 coordinates with local GPU gatekeepers 262, 272, 282 on nodes 260, 270, 280 respectively to enable resource sharing among the multiple GPUs 264, 274, 276, 284.

GPU distributed gatekeeper 250 communicates periodically with local gatekeepers 262, 272, 282 to determine their resource availability in terms of free GPU cores and memory. Applications 210, 212 specify their requirements to GPU distributed gatekeeper 250, which can then perform matching of resource requirements (from applications 210, 212) to resource availability (on GPUs 264, 274, 276, 284). GPU distributed gatekeeper 250 can also optimize performance by deciding how much of each GPU 264, 274, 276, 284 should be given to each application 210, 212, and which applications 210, 212 should be co-located.

GPU distributed gatekeeper 250 can also act in a distributed manner and expose the resource availability of GPUs 264, 274, 276, 284 to applications 210, 212, who can then decide how much of the resources each application 210, 212 wishes to utilize. Once a decision is made, the application can request specific slices of specific GPUs. In the example of FIG. 2, application 210 is mapped to GPU 264 on node 260 and to GPU 274 on node 270 while application 212 is mapped to GPU 276 on node 270 and to GPU 284 on node 280.

Once the mapping of applications 210, 212 to GPUs 264, 274, 276, 284 is complete, sharing at each GPU 264, 274, 276, 284 is managed by the respective local gatekeepers 262, 272, 282. Further, each application 210, 212 may be responsible for distributing its computation and data on the multiple GPUs 264, 274, 276, 284. In examples, GPU distributed gatekeeper 250 may also be responsible for ensuring that an application (e.g., applications 210, 212) also gets access to at least one central processing unit (CPU) core on each node that hosts a GPU slice, which may guide the placement of applications on GPUs.

Figure 3:
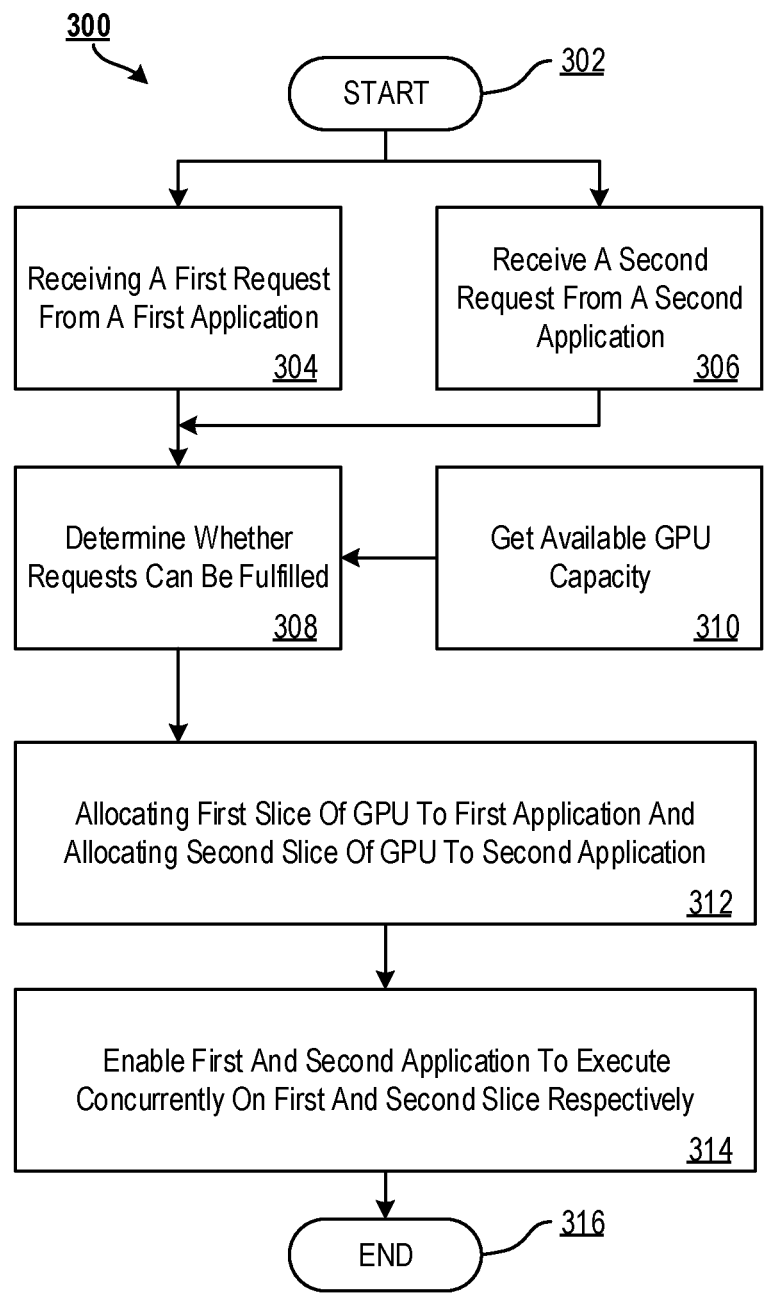
FIG. 3 illustrates a flow diagram of a method for GPU resource sharing among a plurality of applications according to examples of the present disclosure.

FIG. 3 illustrates a flow diagram of a method 300 for GPU resource sharing among a plurality of applications on a single processing system (e.g., computer, server, etc.) according to examples of the present disclosure. Method 300 starts at block 302 and continues to block 304.

At block 304, method 300 includes receiving a first request, which may include a minimum and/or maximum amount of resources, from a first application of the plurality of applications for first requested GPU resources, the GPU resources comprising a processor and a memory. In examples, the processor comprises multiple GPU cores, wherein each GPU core of the multiple GPU cores comprises a plurality of hardware threads. At block 306, method 300 includes receiving a second request, which may also include a minimum and/or/maximum amount of resources from a second application of the plurality of applications for second GPU resources. At block 308, method 300 includes determining whether the first request and/or the second request can be fulfilled, for example, while satisfying a fairness policy, if any. At block 310, method 300 includes getting the availability of the GPU capacity to determine whether the requests can be fulfilled at block 308. At block 312, method 300 includes, responsive to determining that the first requested GPU resources are available, allocating a first slice of the GPU resources with a first requested amount of resources to the first application, and, responsive to determining that the second requested GPU resources are available, allocating a second slice of the GPU resources with a second requested amount of resources to the second application. At block 314, method 300 includes enabling the first application and the second application to execute concurrently within the first slice of the GPU and the second slice of the GPU respectively. Method 300 continues to block 316 and ends.

In examples, the first application executes on the first slice, and the second application executes on the second slice. Further, security policies may make the first slice inaccessible to the second application and may make the second slice inaccessible to the first application, (i.e., the slices are in isolation with respect to one another). This provides security and privacy between the applications.

In aspects of the present disclosure, receiving the first request, receiving the second request, assigning the first slice to the first container, and assigning the second slice to the second container are performed by a gatekeeper, for example, as discussed regarding FIG. 1.

Additional processes also may be included. For example, method 300 may include receiving a third request from a third application of the plurality of applications and, responsive to determining that the third requested GPU resources are available, allocating a third slice of the GPU resources with a third requested amount of resources to the third application. Method 300 may further include enabling the third application to execute on the third slice concurrently with the first application executing on the first slice and the second application executing on the second slice. It should be understood that the processes depicted in FIG. 3 represent illustrations, and that other processes may be added or existing processes may be removed, finish executing, modified, or rearranged without departing from the scope and spirit of the present disclosure.

Figure 4:
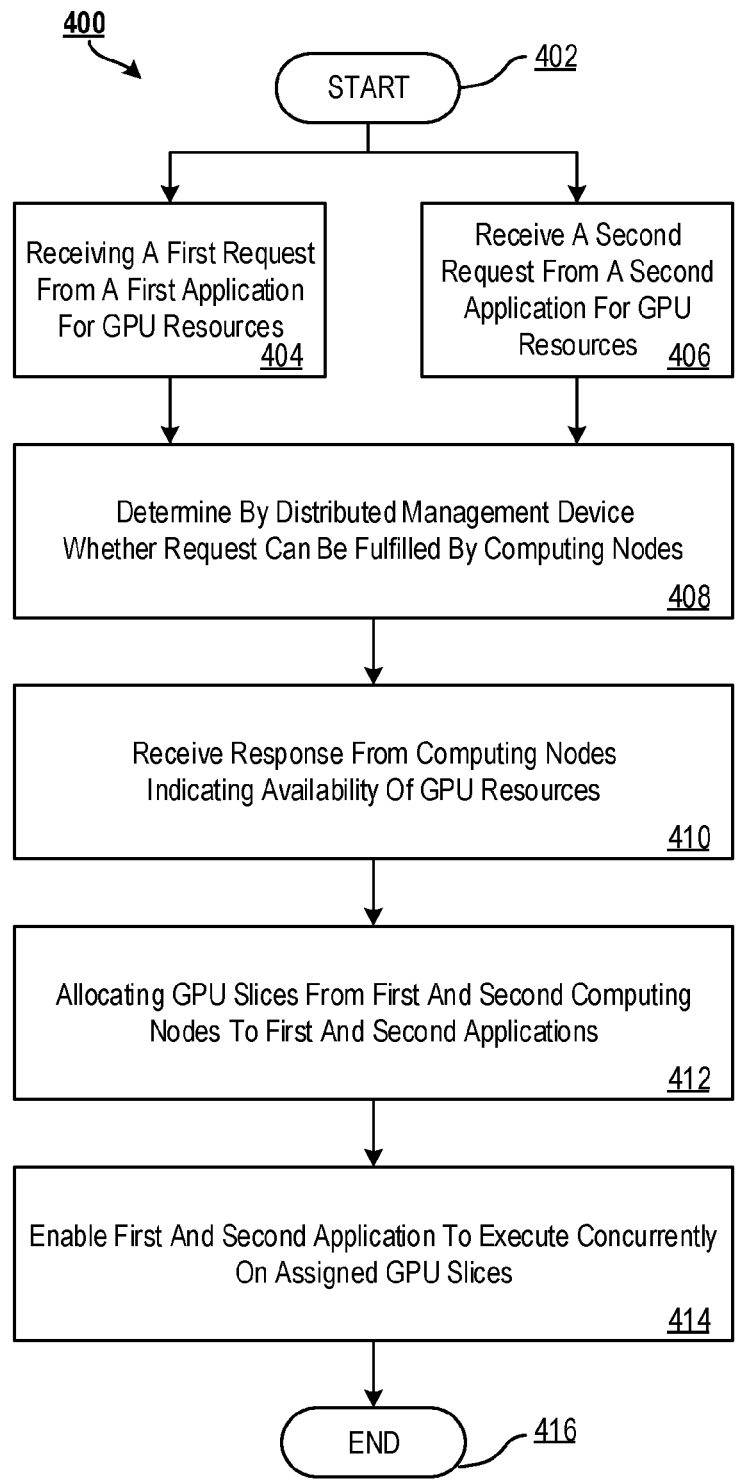
FIG. 4 illustrates a flow diagram of a method for GPU resource sharing in a distributed environment according to examples of the present disclosure.
Figure 5:
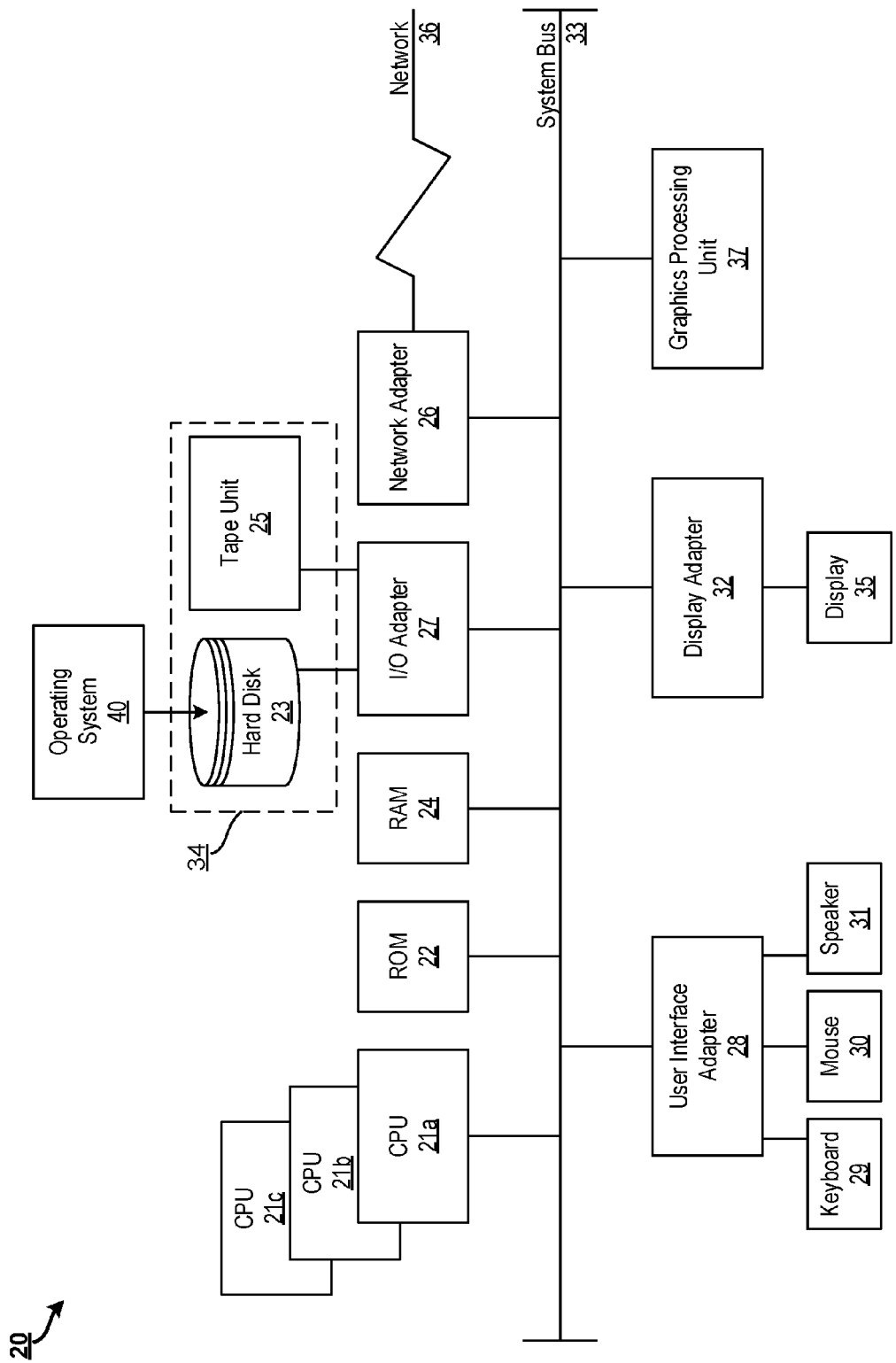
FIG. 5 illustrates a block diagram of a processing system for implementing the techniques described herein according to examples of the present disclosure.

FIG. 4 illustrates a flow diagram of a method 400 for GPU resource sharing in a distributed environment according to examples of the present disclosure. In particular, method 400 provides for graphics processing unit (GPU) resource sharing among a plurality of distributed applications in a distributed computing environment comprising a plurality of computing nodes, each of the plurality of computing nodes comprising a GPU. Method 400 starts at block 402 and continues to block 404.

At block 404, method 400 includes receiving a first request from a first distributed application of the plurality of distributed applications for first requested GPU resources among the plurality of computing nodes, the GPU resources comprising a processor and a memory. At block 406, method 400 includes receiving a second request from a second distributed application of the plurality of distributed applications for second requested GPU resources among the plurality of computing nodes. It should be appreciated that blocks 404 and 406 may be performed concurrently or sequentially.

At block 408, method 400 includes determining by a distributed management device (e.g., GPU distributed gatekeeper 250 of FIG. 2) whether the requests can be fulfilled by the plurality of computing nodes. This determination may be made by querying the computing nodes. At block 410, method 400 includes receiving a response from the computing nodes that indicates the availability of GPU resources available at each of the computing nodes. At block 412, method 400 includes, allocating GPU slices from the plurality of computing nodes to the first and second applications, for example, while satisfying a fairness policy, if any. At block 414, method 400 includes enabling the first and second applications to execute concurrently on the assigned GPU slices.

In one example with two applications (APP 1 and APP 2) and two computing nodes (node 1 and node 2), the following may occur. APP 1 requests GPU resources of 6,000 processing cores and 6 GB of memory and APP 2 requests GPU resources of 10,000 processing cores and 10 GB of memory. The requests are received by a distributed management device (e.g., GPU distributed gatekeeper 250 of FIG. 2), which gets the available GPU capacity from node 1 and node 2. In the present example, node 1 indicates that it has 4,000 processing cores and 8 GB of memory available on GPU 1A and 4,000 processing cores and 8 GB of memory available on GPU 1B. Similarly, node 2 indicates that it has 4,000 processing cores and 8 GB of memory available on GPU 2A and 4,000 processing cores and 8 GB of memory available on GPU 2B. The distributed management device (e.g., GPU distributed gatekeeper 250 of FIG. 2) allocates two slices from GPU 1A and two slices from GPU 1B of 2,000 processing cores and 2 GB of memory each to APP 1. The distributed management device also allocates two slices of 2,000 processing cores and 2 GB of memory from each of GPUs 2A and 2B of node 2 and one slice of 2,000 processing cores and 2 GB of memory from GPU 1B of node 1 for a total of five slices totaling 10,000 processing cores and 10 GB of memory as requested.

Additional processes also may be included, and it should be understood that the processes depicted in FIG. 4 represent illustrations, and that other processes may be added or existing processes may be removed, modified, or rearranged without departing from the scope and spirit of the present disclosure.

It is understood in advance that the present disclosure is capable of being implemented in conjunction with any other type of computing environment now known or later developed. For example, FIG. 4 illustrates a block diagram of a processing system 20 for implementing the techniques described herein. In examples, processing system 20 has one or more central processing units (processors) 21a, 21b, 21c, etc. (collectively or generically referred to as processor(s) 21). In aspects of the present disclosure, each processor 21 may include a reduced instruction set computer (RISC) microprocessor. Processors 21 are coupled to system memory (e.g., random access memory (RAM) 114) and various other components via a system bus 33. Read only memory (ROM) 22 is coupled to system bus 33 and may include a basic input/output system (BIOS), which controls certain basic functions of processing system 20.

Further illustrated are an input/output (I/O) adapter 27 and a communications adapter 26 coupled to system bus 33. I/O adapter 27 may be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 20 may be stored in mass storage 34. A network adapter 26 interconnects system bus 33 with an outside network 36 enabling processing system 20 to communicate with other such systems.

A display (e.g., a display monitor) 35 is connected to system bus 113 by display adaptor 32, which may include a graphics adapter to improve the performance of graphics intensive applications and a video controller. In one aspect of the present disclosure, adapters 26, 27, and/or 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 may be interconnected to system bus 33 via user interface adapter 28, which may include, for example, a Super I/O chip integrating multiple device adapters into a single integrated circuit.

In some aspects of the present disclosure, processing system 20 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 20 includes processing capability in the form of processors 21, storage capability including system memory (e.g., RAM 24), and mass storage 34, input means such as keyboard 29 and mouse 30, and output capability including speaker 31 and display 35. In some aspects of the present disclosure, a portion of system memory (e.g., RAM 24) and mass storage 34 collectively store an operating system such as the AIX® operating system from IBM Corporation to coordinate the functions of the various components shown in processing system 20.

In other examples, the present disclosure may be implemented on cloud computing. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
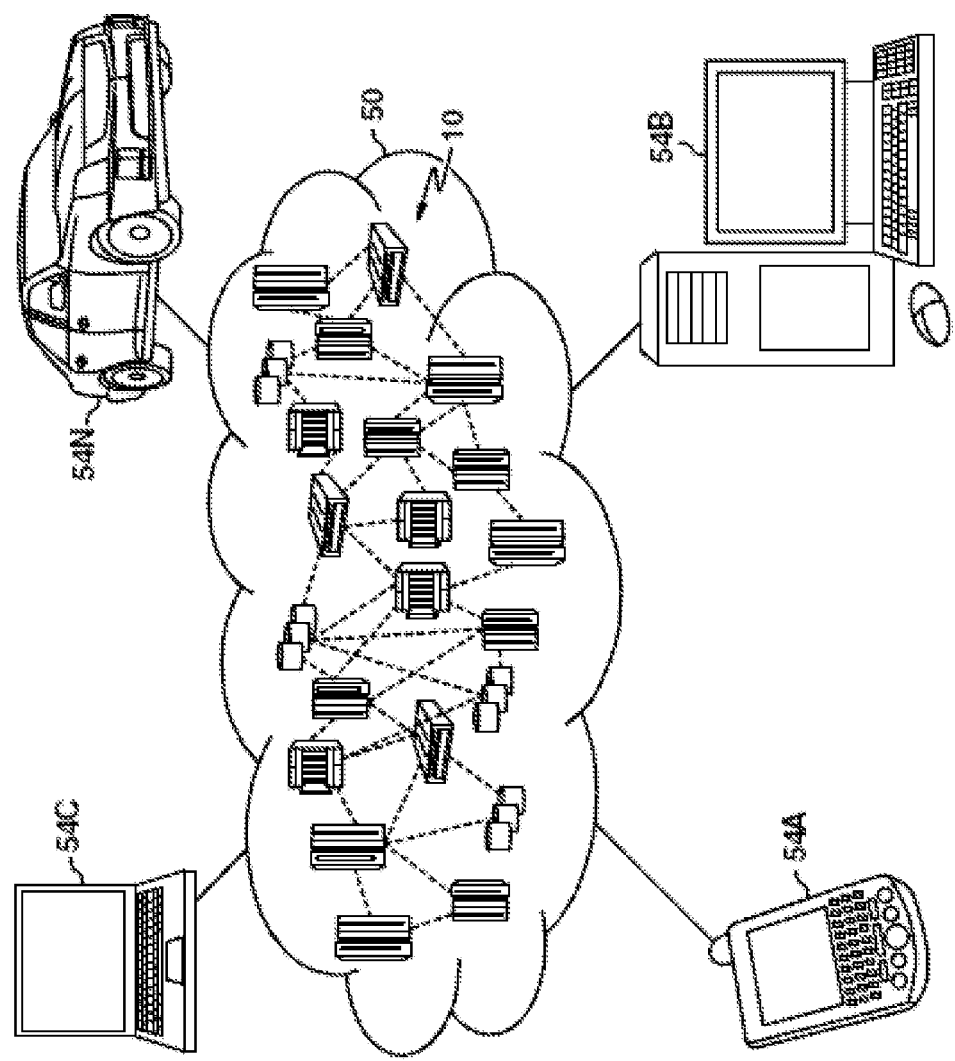
FIG. 6 illustrates a cloud computing environment according to examples of the present disclosure.

Referring now to FIG. 6, illustrative cloud computing environment 50 is illustrated. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
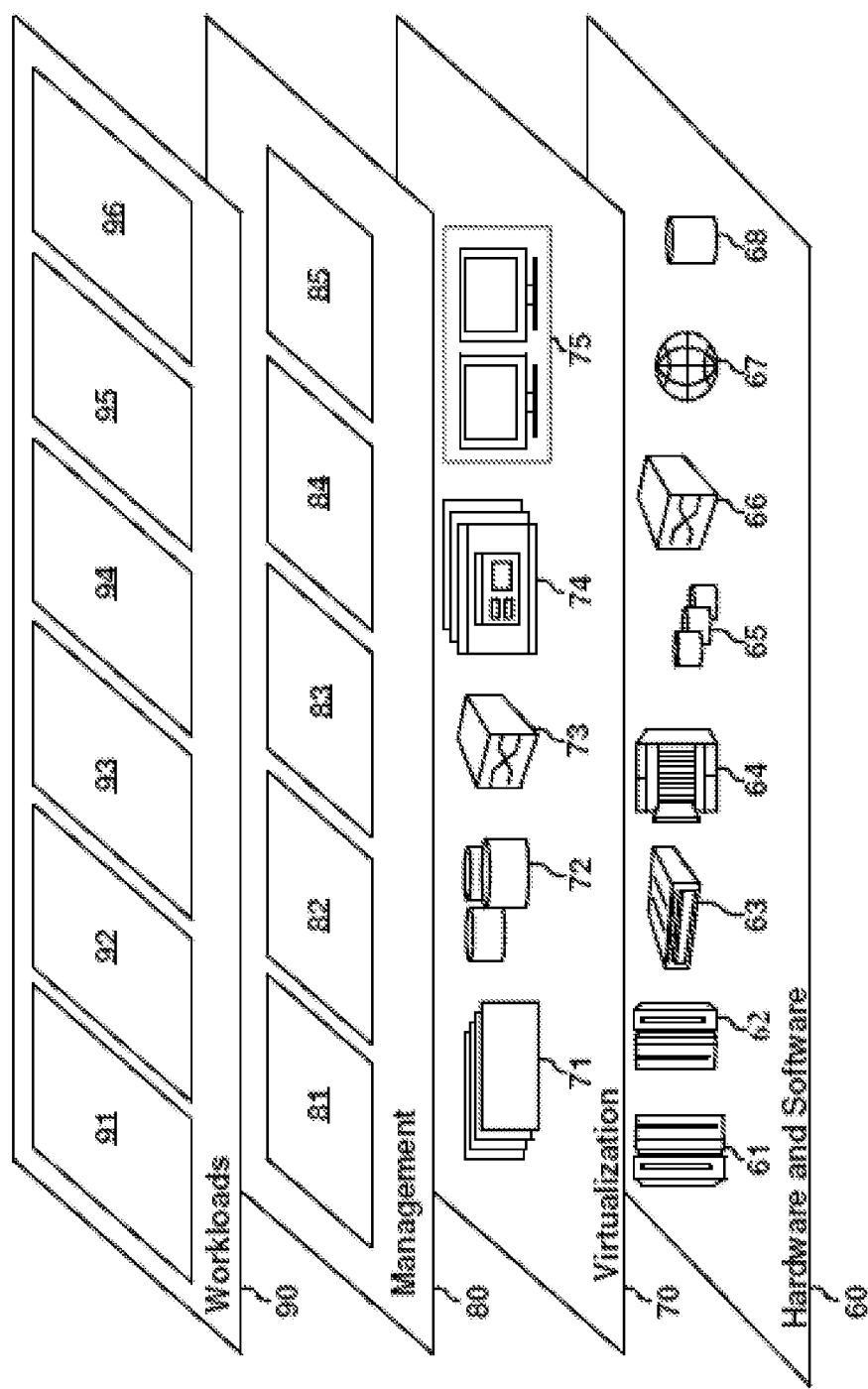
FIG. 7 illustrates abstraction model layers according to examples of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As illustrated, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and GPU resource sharing 96.

The present techniques may be implemented as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to aspects of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various examples of the present disclosure have been presented for purposes of illustration, but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

What is claimed:

1. A computer-implemented method for sharing resources of a graphics processing unit (GPU) among a plurality of applications, the method comprising:

receiving a first request from a first application of the plurality of applications for first requested GPU resources, the GPU resources comprising a processor and a memory;

receiving a second request from a second application of the plurality of applications for second GPU resources;

responsive to determining that the first requested GPU resources are available, allocating a first slice of the GPU resources with a first requested amount of resources to the first application;

responsive to determining that the second requested GPU resources are available, allocating a second slice of the GPU resources with a second requested amount of resources to the second application; and enabling the first application and the second application to execute concurrently within the first slice of the GPU and the second slice of the GPU respectively, wherein allocating the first application to the first slice and allocating the second application to the second slice is performed according to a fairness policy, wherein the fairness policy establishes that an allocated percent of the memory is less than or equal to an allocated percent of the processor.

2. The computer-implemented method of claim 1, wherein the first slice is inaccessible to the second application and wherein the second slice is inaccessible to the first application.

3. The computer-implemented method of claim 1, further comprising:

receiving a third request from a third application of the plurality of applications for third requested GPU resources; and responsive to determining that the third requested GPU resources are available, allocating a third slice of the GPU resources with a third requested amount of resources to the third application.

4. The computer-implemented method of claim 3, further comprising:
enabling the third application to execute on the third slice concurrently with the first application executing on the first slice and the second application executing on the second slice.

5. The computer-implemented method of claim 1, wherein receiving the first request, receiving the second request, allocating the first slice to a first container, and allocating the second slice to a second container are performed by a gatekeeper.

6. The computer-implemented method of claim 1, wherein the processor comprises multiple GPU cores, wherein each GPU core of the multiple GPU cores comprises a plurality of hardware threads.

7. The computer-implemented method of claim 1, wherein the first request is a request for at least one of a desired minimum and a desired maximum amount of resources, and wherein the second request is a request for at least one of a desired minimum and a desired maximum amount of resources.

8. A system for sharing resources of a graphics processing unit (GPU) among a plurality of applications, the system comprising:
a processor in communication with one or more types of memory, the processor configured to:
receive a first request from a first application of the plurality of applications for first requested GPU resources, the GPU resources comprising a processor and a memory;
receive a second request from a second application of the plurality of applications for second GPU resources;
responsive to determining that the first requested GPU resources are available, allocate a first slice of the GPU resources with a first requested amount of resources to the first application;
responsive to determining that the second requested GPU resources are available, allocate a second slice of the GPU resources with a second requested amount of resources to the second application; and
enable the first application and the second application to execute concurrently within the first slice of the GPU and the second slice of the GPU respectively, wherein allocating the first application to the first slice and allocating the second application to the second slice is performed according to a fairness policy, wherein the fairness policy establishes that an allocated percent of the memory is less than or equal to an allocated percent of the processor.

9. The system of claim 8, wherein the first slice is inaccessible to the second application and wherein the second slice is inaccessible to the first application.

10. The system of claim 8, wherein the processor is further configured to:
receive a third request from a third application of the plurality of applications for third requested GPU resources; and
responsive to determining that the third requested GPU resources are available, allocate a third slice of the GPU resources with a third requested amount of resources to the third application.

11. The system of claim 10, wherein the processor is further configured to:
enable the third application to execute on the third slice concurrently with the first application executing on the first slice and the second application executing on the second slice.

12. The system of claim 8, wherein receiving the first request, receiving the second request, allocating the first slice to a first container, and allocating the second slice to a second container are performed by a gatekeeper.

13. The system of claim 8, wherein the processor comprises multiple GPU cores, wherein each GPU core of the multiple GPU cores comprises a plurality of hardware threads.

14. The system of claim 8, wherein the first request is a request for at least one of a desired minimum and a desired maximum amount of resources, and wherein the second request is a request for at least one of a desired minimum and a desired maximum amount of resources.

15. A computer program product for sharing resources of a graphics processing unit (GPU) among a plurality of applications, the computer program product comprising:
a non-transitory storage medium readable by a processing circuit and storing instructions for execution by the processing circuit for performing a method comprising:
receiving a first request from a first application of the plurality of applications for first requested GPU resources, the GPU resources comprising a processor and a memory;
receiving a second request from a second application of the plurality of applications for second GPU resources;
responsive to determining that the first requested GPU resources are available, allocating a first slice of the GPU resources with a first requested amount of resources to the first application;
responsive to determining that the second requested GPU resources are available, allocating a second slice of the GPU resources with a second requested amount of resources to the second application; and
enabling the first application and the second application to execute concurrently within the first slice of the GPU and the second slice of the GPU respectively, wherein allocating the first application to the first slice and allocating the second application to the second slice is performed according to a fairness policy, wherein the fairness policy establishes that an allocated percent of the memory is less than or equal to an allocated percent of the processor.

16. The computer program product of claim 15, wherein the first slice is inaccessible to the second application and wherein the second slice is inaccessible to the first application.

17. The computer program product of claim 15, wherein the method further comprises:
receiving a third request from a third application of the plurality of applications for third requested GPU resources; and
responsive to determining that the third requested GPU resources are available, allocating a third slice of the GPU resources with a third requested amount of resources to the third application.

* * * * *